Patented Mar. 4, 1941

2,233,590

UNITED STATES PATENT OFFICE 2,233,590

MANUFACTURE OF ALIPHATIC KETONE-DIARYLAMINE ANTIOXIDANTS

Charles S. Dewey, Cheshire, Conn., assignor, by mesne assignments, to United States Rubber Company, New York, N. Y., a corporation of New Jersey No Drawing. Application December 9, 1937, Serial No. 178,969

6 Claims. (Cl. 260—65)

This invention relates to an improvement in the manufacture of aliphatic ketone-diarylamine antioxidants, and more particularly solid condensation products thereof as well as to use of the same in the preservation of rubber and the like.

The properties, chemical and physical, of aliphatic ketone-diarylamine condensation products are more or less dependent on their method of manufacture since they are composite complex bodies varying in constitution and proportion of components. Prior processes for producing materials that will have antioxidant characteristics in this class have been those carried out at atmospheric pressures (reflux) at temperatures up to 100° C. wherein the reaction is prolonged, or those wherein the reaction is required to be completed by heat treatment at temperatures of at least 200° C. at superatmospheric pressures (autoclavic).

An object of the present invention is to provide a process whereby to effect the condensation of an aliphatic ketone and a diarylamine in a more rapid and economical way and without having to resort to the high temperatures heretofore employed. A further object is to provide by the use of such a process, materials which will have antioxidant characteristics and which are solid pulverulent condensation products substantially free of any unreacted starting material.

With these various considerations in mind, I have now devised a process for reacting aliphatic ketones with diarylamines, particularly those chosen from the class consisting of the benzene and naphthalene series, under autoclavic conditions whereby temperatures in excess of 200° C. are avoided and at the same time enabling the production of pulverulent solids from composite reaction products having outstanding antioxidant properties.

According to the invention the reaction between the aliphatic ketone and diarylamine is carried out in an autoclave at temperatures in the range between 110° C.–200° C., preferably from about 140° C. to about 160° C., the pressures in the latter instance being on the order of about 150 lbs. per sq. in. and varying with the temperature, the relation of the size of the batch to the size of the reaction vessel and with the stage of the reaction. In all cases in view of the relatively lower temperatures necessary compared with the heretofore known autoclavic processes, the pressures developed in the reaction vessel will be markedly lower than those developed in the employment of temperatures exceeding 200° C. This of course means less hazards and wear to any given autoclavic equipment.

For every molecular proportion of the diarylamine there should be reacted at least one molecular proportion of the ketone, and an acidic dehydration catalyst for the reaction should be employed, preferably a halogen-containing catalyst such as iodine, hydriodic acid, ferrous iodide, etc. in amounts ranging from 0.5 to about 3% based on the weight of the diarylamine.

The following examples are given to illustrate the invention:

Example 1.—A mixture of 40 grams of diphenylamine, 28 grams acetone, and 0.2 gram iodine are heated in a pressure glass or vitreous lined bomb or autoclave for about 15 hrs. at approximately 154° C. The crude reaction product is then freed of catalyst by extraction with a caustic soda or equivalent alkali and washing with water, and any excess unreacted starting reagents are removed by distillation. The resulting product (about 53 grams) is an amber translucent resin, which when pulverized and tested in a rubber tread stock gives both superior resistance to oxygen ageing and good protection against flexing deterioration.

Example 2.—A mixture of 40 grams of diphenylamine, 26 grams acetone, and 1.0 gram hydrogen iodide are heated in a pressure glass or vitreous lined bomb or autoclave for about 10 hrs. at approximately 150° C. The crude reaction product is purified in the same manner as set forth in Example 1, and when pulverized and tested in a rubber tread stock also showed itself to have good antioxidant characteristics. The sintering point of this resin is about 70° C.

Iron has an inhibitory influence on this reaction and the use of an iron autoclave is inadvisable.

The pulverulent resinous acetone-diphenylamine products have in general a sintering temperature above 50° C. and preferably ranging from about 70° C. to about 90° C., and varying in this range with the catalyst employed.

The process may be modified by employing other aliphatic ketones, for example, mesityl oxide, phorone, diethyl ketone, ethyl methyl ketone, dimethyl ketone, dipropyl ketone, dibutyl ketone, etc., and in place of diphenylamine for reacting with any of the ketones, other diarylamines may be employed, for example, ditolylamine, dixylylamine, N,N'-diphenyl p-phenylene diamine, phenyl tolylamine, dinaphthylamine, phenyl alpha naphthylamine, phenyl beta naphthylamine, etc.

The composite products may be employed for preserving and protecting rubber, unvulcanized or vulcanized, and similar oxidizable materials which tend to deteriorate by absorption of oxygen from the air, for example, goods of rubber and allied gums, unsaturated fatty oils such as unsaturated vegetable oils, essential oils, petroleum oils and their derivatives including cracked gasolines, soaps, aldehydes, synthetic resins, and the like, by incorporation of amounts ranging from 0.1% to 5% by weight.

The term "rubber" is used broadly to include caoutchouc, balata, gutta percha, and similar vulcanizable gums, as well as synthetic rubbers, rubber isomers, reclaimed rubber, etc., and natural or artificially-prepared latices, compounded or not with fillers, accelerators, softeners, etc.

Having thus described my invention, what I claim and desire to protect by Letters Patent is:

1. A method of producing a pulverizable solid aliphatic ketone-diarylamine antioxidant which consists in autoclavicly reacting together at least one molecular proportion of an aliphatic ketone with one molecular proportion of a diarylamine consisting solely of amine and aromatic radicals, in the presence of an acidic condensation catalyst, at a temperature in the range between 110° C. and 200° C., and under pressure greater than atmospheric, and subsequently purifying the reaction product of catalyst and any starting reagents.

2. A method of producing a pulverizable solid dialkyl ketone-diarylamine antioxidant which consists in autoclavicly reacting together at least one molecular proportion of a dialkyl ketone with one molecular proportion of a diarylamine consisting solely of amine and aromatic radicals, in the presence of a halogen-containing condensation catalyst, at a temperature in the range from about 140° C. to 160° C. and under pressure greater than atmospheric, and subsequently purifying the reaction product of catalyst and any starting reagents.

3. A method of producing a pulverizable solid dialkyl ketone-diarylamine antioxidant which consists in autoclavicly reacting together at least one molecular proportion of acetone with one molecular proportion of diphenylamine, in the presence of a halogen-containing condensation catalyst, at a temperature in the range from about 140° C. to 160° C. and under pressure greater than atmospheric, and washing with alkali and water and distilling off any unreacted starting reagents.

4. A method of producing a pulverizable solid dialkyl ketone-diarylamine antioxidant which consists in autoclavicly reacting together at least one molecular proportion of acetone with one molecular proportion of phenyl beta naphthylamine, in the presence of a halogen-containing condensation catalyst, at a temperature in the range from about 140° C. to 160° C. and under pressure greater than atmospheric, and washing with alkali and water and distilling off any unreacted starting material.

5. A method of producing a pulverizable solid acetone-diphenylamine antioxidant in which the reacting conditions consist of condensing together in an autoclave at least one molecular proportion of acetone with one molecular proportion of diphenylamine, in the presence of an acidic condensation catalyst, at a temperature in the range from about 140° C. to 160° C. and under pressure greater than atmospheric.

6. A method of producing a pulverizable solid acetone-diphenylamine antioxidant in which the reacting conditions consist of condensing together in an autoclave at least one molecular proportion of acetone with one molecular proportion of diphenylamine, in the presence of an acidic condensation catalyst, at approximately 150° C. and under pressure greater than atmospheric.

CHARLES S. DEWEY.